CIRCUIT FOR ENABLING SIMULTANEOUS TRANSMISSION IN BOTH DIRECTIONS ON A TWO-WIRE LINE
Filed March 10, 1967
FIG. 1
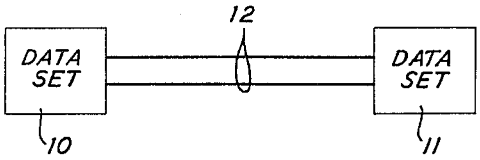
FIG. 2
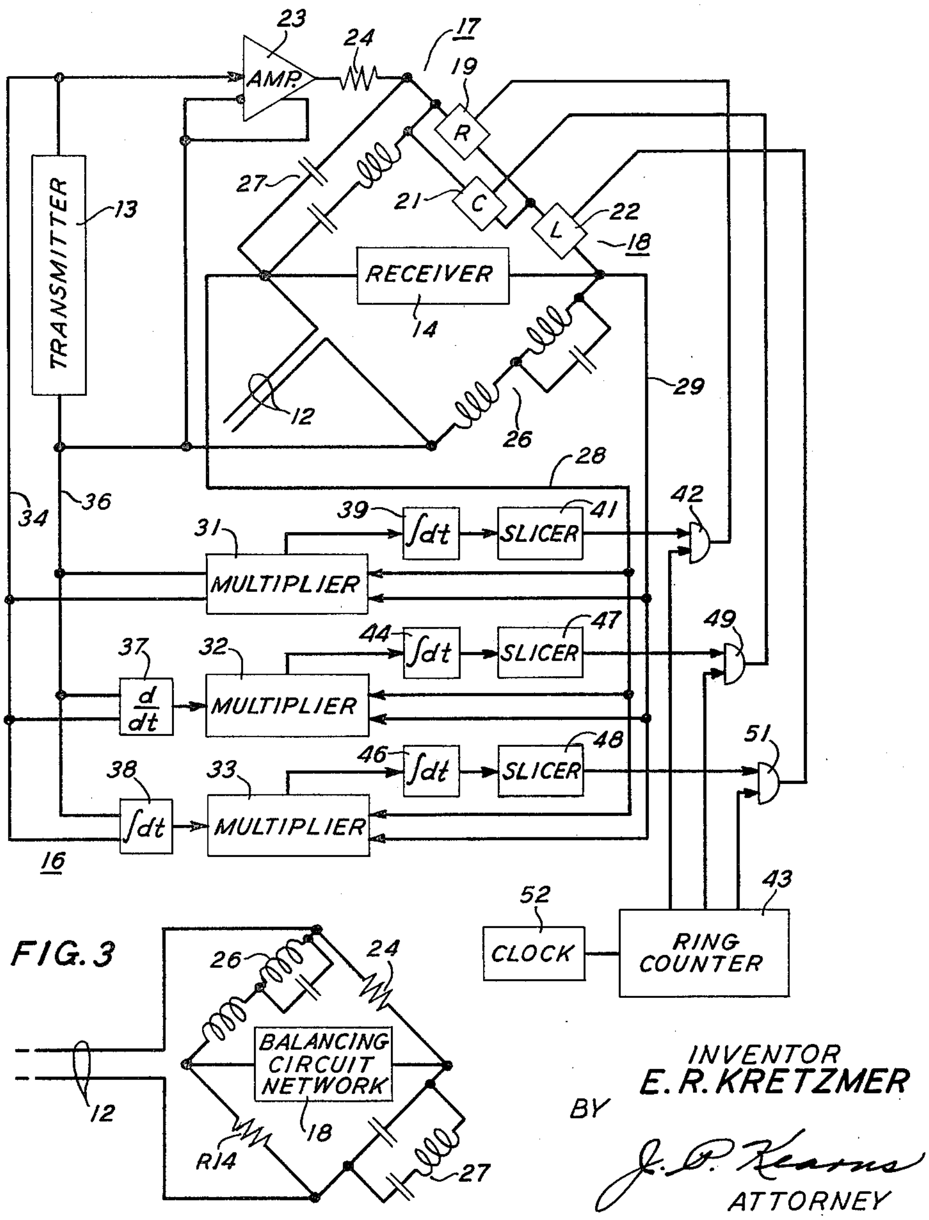
FIG. 2, FIG. 3
INVENTOR
E. R. KRETZMER
BY
J. P. Kearns
ATTORNEY 3,479,468

CIRCUIT FOR ENABLING SIMULTANEOUS TRANSMISSION IN BOTH DIRECTIONS ON A TWO-WIRE LINE

Ernest R. Kretzmer, Holmdel, N.J., assignor to Bell Telephone Laboratories, Incorporated, Murray Hill, N.J., a corporation of New York Filed Mar. 10, 1967, Ser. No. 622,195
Int. Cl. H04m 1/19
U.S. Cl. 179—81 8 Claims

ABSTRACT OF THE DISCLOSURE

A Wheatstone bridge for connecting a data transmitter and a data receiver to the same end of a two-wire line with a minimum of crosstalk. The two-wire line is one arm of the bridge while the opposite one is an adjustable impedance. Signals across the transmitter and receiver are processed in a circuit including an integrator, a differentiator and three multipliers to provide adjusting signals for the adjustable impedance. The two other arms of the bridge are each formed by one of a pair of dual reactive impedances. The source impedance of devices across the diagonals of the bridge are arranged so that the impedance terminating the two-wire line is constant notwithstanding changes in the adjustable impedance.

FIELD OF THE INVENTION

This invention relates to a circuit for enabling simultaneous data transmission in both directions on a two-wire line and particularly to a circuit for isolating a weak distant signal in the presence of a strong local signal.

BACKGROUND OF THE INVENTION

It has long been the practice to provide two-way communications over two-wire lines by connecting a transmitter and a receiver to each of the two terminals of the two-wire line. A balanced circuit, such as a hybrid boil, may be employed to connect the transmitter and receiver to each terminal so that the receiver will be protected from strong local signals generated in the transmitter. It should be noted that if the local signal is strong enough to satisfactorily activate a receiver on a distant end of the two-wire line after being attenuated by that line, the signal could be strong enough to damage the local receiver or at least discomfort a person listening there.

For voice communications, however, complete isolation of the local transmitted signal from the local receiver is not necessary to prevent confusion since it is inherent in normal conversation for two persons to try to speak alternately rather than simultaneously. A person speaking may find it quite difficult to listen to another's conversation even if there were complete isolation between his mouth and ear. Therefore, small amounts of feedback of one's own conversation into the local receiver caused by differing impedances from two-wire line to four-wire line have not been found objectionable.

One might desire, however, to connect data sets to both ends of a two-wire line so that both data sets may simultaneously transmit and receive. For simultaneous data transmission it is desirable to separate out a distant signal 40 db below a strong local signal so that the receiver sees the local signal as 20 db below the distant received signal. In other words, 60 db of separation is necessary. The balanced isolating circuit used for voice communications cannot satisfactorily isolate the transmitter and receiver in data sets.

DESCRIPTION OF PRIOR ART

Balanced isolating circuits have also been used in long distance communications at four-wire to two-wire junctions. In the past, attempts have been made to adjust automatically the balanced isolating circuits at these two-wire to four-wire junctions to obtain in excess of 60 db isolation (see in this connection U.S. Patent No. 2,302,374, issued on Nov. 17, 1942 to D. Mitchell and entitled "Two-Way Signal Transmission System"). These prior art attempts have generally failed in a commercial environment. One factor leading to these failures is the high-ambient noise level present in long distance communications systems. The noise signals cannot be distinguished from automatic adjusting signals so that the balanced iolating circuits are actually unbalanced by noise signals. A second factor probably leading to failure of these systems is that, as the balanced isolating circuits are adjusted, the impedance offered the two-wire line varies so as to cause reflections along the two-wire line.

Another approach to simultaneous two-way transmission on a two-wire line is to separate the two transmission signals into different frequency channels. It has been found that channel separating filters alone are not always desirable because excessive bandwidth may be consumed in producing adequate separation when economical filters are employed.

SUMMARY OF THE INVENTION

The present invention contemplates a balanced circuit having a transmitter port, a receiver port, a two-wire line port and a control-signal-responsive adjustable impedance. Signals appearing at the transmitter and receiver ports are compared in a processing circuit to provide the control signal.

In a first embodiment the adjustable impedance has resistive, inductive and capacitive components. The processing circuit includes: a multiplier circuit for providing a resistance-sensitive component of the control signal; and a differentiating circuit and a multiplying circuit for providing a capacitance-sensitive component of the control signal.

In a second embodiment, the balanced circuit is a four-arm bridge. The line port and the adjustable impedance serve as opposite arms of the bridge. The two remaining arms of the bridge are formed by a pair of dual impedance networks.

DESCRIPTION OF THE DRAWINGS

FIG. 1 is a block diagram of two data sets connected by a two-wire line;

FIG. 2 shows partly in schematic and partly in block diagram form a balanced network for connecting a transmitter and a receiver to a two-wire line according to the principles of this invention; and FIG. 3 shows partly in schematic and partly in block diagram form a rearrangement of part of the balanced circuit of FIG. 2 to facilitate explanation.

DETAILED DESCRIPTION

Referring now to FIG. 1, there are shown two data sets 10 and 11 connected by a two-wire line 12. The two-wire line may include one or more sections of two-wire cable switched together in a telephone central office at the request of either data set 10 or 11 to produce the connection of the data sets 10 and 11 for a particular call. The exact impedance of the two-wire line 12 may differ slightly for the same data set 10 or 11 from call to call because different sections of two-wire cable may be used for different calls. Each of the data sets 10 and 11 is provided with a transmitter 13 and a receiver 14 connected to the two-wire line 12 by a balanced circuit 16 as shown in FIG. 2. The balanced circuit 16 includes a Wheatstone bridge 17 having the two-wire line 12 as one of four arms. The arm opposite the two-wire line 12 is formed by balancing circuit network 18 including a variable resistance 19, a variable capacitance 21 and a variable inductance 22 for balancing the bridge despite slight variations in the impedance of the line 12. The receiver 14 is connected across the horizontal diagonal of the bridge 17 while the transmitter 13 is connected to an input of a low output impedance differenial isolation amplifier 23, a unidirectional transmission device, which drives the vertical diagonal of the bridge 17 through a resistor 24. The two remaining arms of the bridge 17 are each formed by one of a pair of reactive dual impedances 26 and 27.

In operation during transmission, a signal generated by the transmitter 13 will be passed on by isolation amplifier 23 to be impressed across the vertical diagonal of the bridge 17. With the bridge 17 in perfect balance, it is apparent that no signal will appear across the receiver 14. A portion of the generated signal will reach the line 12. An amount of signal proportional to the sum of the currents flowing in the two sides of the bridge 17 will be lost across the resistor 24. The signal will be further reduced by the voltage division in the left side of the bridge 17 between the network 27 and the line 12. Therefore, it is seen that if the transmitter 13 is assigned a frequency so that the network 27 offered a low impedance while the network 26 offered a high impedance, most of the current flowing in the resistor 24 also flows in the left side of the bridge 17 and the voltage division between the network 27 and the line 12 becomes favorable. With this arrangement a maximum amount of power reaches the line 12 for a given value of the resistor 24.

The bridge circuit 17 along with the circuitry associated with the transmitter 13 and the receiver 14 has been redrawn in FIG. 3 to show relationships between currents and voltages in the balanced circuit 16 when a signal is received along the two-wire line 12. It is seen that looking at balanced circuit 16 from the two-wire line 12, a second bridge circuit is formed having two arms in common with the bridge circuit 17. These two arms are formed by the dual impedance networks 26 and 27. The other two arms are formed by the impedance of the receiver designated R14 and the resistance 24 connected to the two-wire line 12 through the low output impedance of the amplifier 23 (omitted in FIG. 3). It should be noted that if an amplifier with a known output impedance were available, resistor 24 would not be necessary. However, most amplifiers having stable gain generally employ a negative feedback which renders the output impedance of such an amplifier low but relatively unpredictable. If this second bridge circuit is balanced, it is seen that no received voltage will be induced across the variable impedance network 18. Therefore, variation of this impedance will not vary the impedance terminating the two-wire line 12. Therefore, bridge circuit 17 can be balanced by variation of the varible impedance 18 to reduce the transmitted power coupled through to the receiver 14 without affecting the terminating impedance of the two-wire line 12. Further, if the frequency of the received signal is chosen so that the impedance of network 27 is high and the impedance of network 26 is low, more power will be transmitted to the receiver 14 than to the resistor 24. Moreover, it is seen that due to the presence of isolation ampilfier 23, none of the received signal is carried to the transmitter 13. From FIG. 3, it is apparent that the four impedances 24, 26, 27 and R14 necessary for balancing of the second bridge are all discrete impedances in the data set and therefore can be chosen wih sufficient precision to balance that bridge. Therefore, it is possible to balance bridge 17 without altering the termination of the two-wire line 12.

If the bridge circuit 17 is not in perfect balance when a signal is generated by the transmitter 13, a portion of the transmitted signal will appear across the horizontal diagonal of the bridge 17. This signal is applied by leads 28 and 29 to three multipliers 31, 32, and 33. In the past, this signal has been used directly as a control signal to adjust a variable impedance in the bridge so as to balance the bridge. However, noise voltages have appeared which have tended to unbalance the bridge. According to this invention, the transmitted signal is applied by leads 34 and 36 directly to multiplier 31, and by way of differentiator 37 and integrator 38 to multipliers 32 and 33, respectively. Output signals from differentiator 37 and integrator 38 are applied to multipliers 32 and 33, respectively. Multipliers 31, 32, and 33 may advantageously be analog multipliers or may merely sense the sign of the signals appearing across transmitter 13 and receiver 14 and provide outputs indicative thereof.

The output from multiplier 31 is integrated by integrator 39 and then sliced in slicer 41. A slicer is a threshold circuit, such as a Schmitt trigger. An AND gate 42 is periodically enabled by a ring counter 43 to provide a signal for adjusting the variable resistance 19. The output of AND gate 42 will be a positive or negative pulse depending upon the sign of the output of slicer 41. Alternatively, the slicer may be omitted and the AND gate be replaced by an analog transmission gate. Variable resistance 19 may be a ladder attenuator controlled by an up-down counter responsive to the positive and negative pulses or an analog device such as a field effect transistor driven by an integrator responsive to the positive and negative pulses from the AND gate 42 or the analog signal if a slicer is not used. The use of the multiplier 31 in combination with the integrator 39 ensures that only the presence of correlated signal components across transmitter and receiver can generate corrective signals. Signals or noise appearing in either circuit above have no effect. In like manner, output signals from multipliers 32 and 33 are integrated in integrators 44 and 46, respectively, and processed by optional slicers 47 and 48, respectively. Gates 49 and 51, which are periodically enabled by ring counter 43, apply the outputs of slicers 47 and 48, respectively, to the variable capacitance 21 and variable inductance 22 of balancing network 18. Variable capacitance 21 and inductance 22 may also be either ladder circuits driven by up-down counters or analog devices, such as varicaps or saturable core inductors driven by integrators. By differentiating the transmitted signal in differentiator 38 and multiplying that differentiated signal with the signal across receiver 14, a product signal is generated which is indicative of capacitive unbalance in the bridge 17. In like manner, integrator 38 and multiplier 33 provide a control signal indicative of inductive unbalance in the bridge. The multipliers 31, 32, and 33 further serve the purpose of isolating signals for balancing the bridge which are immune to the noise variation. A clock 52 is provided to drive ring counter 43 so that variable resistance 19, variable capacitance 21 and variable inductance 22 can be sequentially and repetitively adjusted allowing for the bridge circuit to stabilize before the next impedance change occurs. This will tend to assure rapid convergence of the impedance 18 towards the value necessary for bridge balance.

In summary, the above circuit adaptively adjusts bridge circuit 17 during two-way transmission in a noisy environment. Dual impedance networks 26 and 27 are provided to filter the transmitted and received signals without unbalancing the bridge at any frequencies. Two-wire line 12 faces a constant impedance even during adjustment of the balancing circuit network 18. Further, it should be noted that if amplifier 23 were not present, balancing circuit network 18 could not be adjusted adaptively during two-way transmission. Received signals coming down two-wire line 12 would otherwise appear across both transmitter 13 and receiver 14 thereby generating adjusting signals no matter whether bridge 17 were balanced or not. In such a situation bridge 17 could, in a high noise environment, be automatically adjusted only during periods when the distant transmitter was silent.

It should be noted that networks 26 and 27 may be resistors and the same frequency band may be used for the transmitted and received signals, in which case the isolation is afforded solely by means of the adaptive bridge balance.

It is to be understood that the above-described embodiment is simply illustrative of an application of the principles of the invention and many other modifications may be made without departing from the spirit and scope of the invention.

What is claimed is:

1. A system for adjusting a balanced circuit having a transmit port, a receive port, a two-wire line port and a control-signal-responsive adjustable balancing network comprising:

a transmitter;

means for connecting said transmit port to said transmitter;

means including a multiplier having first and second input terminals and an output terminal for providing said control signal;

means for connecting said transmitter to said first input terminal of said multiplier;

means for connecting said receive port to said second input terminal of said multiplier; and means for connecting said output terminal to said control-signal-responsive adjustable balancing network to apply said control signal to adjust said balancing network accordingly.

2. A system as defined in claim 1 in which said transmit-port-connecting means includes an isolation device so that signals may flow from said transmitter to said transmit port but not in the reverse direction.

3. A system as defined in claim 1 in which said balanced circuit is a Wheatstone bridge comprising:

a first arm including a two-wire line;

a second arm opposite said first arm including said control-signal-responsive adjustable balancing network; and third and fourth arms each including one of a pair of dual impedances.

4. A system as defined in claim 3 in which said transmit port is formed by one diagonal of said Wheatstone bridge and said receive port is formed by another diagonal of said Wheatstone bridge comprising:

a receiver offering a first impedance connected to said receive port; and a second impedance included in said transmit-port-connecting means so that said third and fourth arms taken with said first impedance and said second impedance form a second balanced Wheatstone bridge.

5. A system as defined in claim 1 in which said control-signal-responsive adjustable balancing network is a variable resistance associated with a variable capacitance responsive to a second control signal and a variable inductance responsive to a third control signal;

a differentiator responsive to said transmitter for providing a differential signal;

means including a second multiplier jointly responsive to said differential signal and a signal across said receiver to provide said second control signal;

an integrator responsive to said transmitter for providing an integrated signal; and means including a third multiplier responsive jointly to said integrated signal and said signal across said receiver to provide said third control signal.

6. A system as defined in claim 5 in which said control-signal-responsive adjustable balancing network is enabled to respond to said control signal by a first enabling signal, said variable capacitance is enabled to respond to said second control signal by a second enabling signal and said variable inductance is enbled to respond to said third enabling signal;

said system including means for sequentially and repetitively generating said first, second, and third enabling signals.

7. In combination:

a two-wire line having first and second ends;

a transmitter;

a receiver;

means for connecting said transmitter and said receiver to said first end of said two-wire line, said means being responsive to a control signal for adjusting the coupling of signals from said transmitter to said receiver; and means responsive to the product of signals across said transmiter and said receiver to provide said control signal.

8. The combination defined in claim 7 in which a second transmitter and a second receiver are connected to said second end of said two-wire line.

References Cited

UNITED STATES PATENTS 2,950,351 8/1960 Leman ............... 179—81

KATHLEEN H. CLAFFY, Primary Examiner

W. A. HELVESTINE, Assistant Examiner

U.S. Cl. X.R.

179—170